United States Patent [19]

Caprara

[11] Patent Number: 5,563,629
[45] Date of Patent: Oct. 8, 1996

[54] DEVICE FOR POINTING THE CURSOR ON THE SCREEN OF INTERACTIVE SYSTEMS

[75] Inventor: Mauro Caprara, Bologna, Italy

[73] Assignee: Sintecna S.r.l., Bologna, Italy

[21] Appl. No.: 307,440

[22] Filed: Sep. 19, 1994

[30] Foreign Application Priority Data

Sep. 24, 1993 [IT] Italy .................. B093A0387

[51] Int. Cl.⁶ ...................................... G09G 5/08
[52] U.S. Cl. ............................... 345/160; 345/184
[58] Field of Search ..................... 345/157, 159, 345/160, 161, 166, 184; 273/438; 250/221

[56] References Cited

U.S. PATENT DOCUMENTS

| | | | |
|---|---|---|---|
| 3,395,287 | 7/1968 | Rajac | 250/221 |
| 3,881,106 | 4/1975 | Pocker et al. | 250/221 |
| 4,686,361 | 8/1987 | Bard | 250/221 |
| 4,719,455 | 1/1988 | Louis | 345/184 |
| 4,806,707 | 12/1989 | Landmeier | |
| 4,931,781 | 6/1990 | Miyakawa | 345/160 |
| 5,045,842 | 9/1991 | Galvin | 345/161 |
| 5,355,148 | 10/1994 | Anderson | 345/166 |

FOREIGN PATENT DOCUMENTS

| | | | |
|---|---|---|---|
| 0312095 | 4/1989 | European Pat. Off. | |
| 0539599 | 5/1993 | European Pat. Off. | |
| 2613850 | 10/1988 | France | |
| 0729583 | 5/1980 | U.S.S.R. | 345/161 |
| 2216994 | 10/1989 | United Kingdom | |

OTHER PUBLICATIONS

IBM Technical Disclosure Bulletin, Joy Stick Mechanism by M. W. Carmichael, vol. 18 No. 8 Jan. 1976.
IBM Technical Disclosure Bulletin vol. 13, No. 9, Feb. 1971 N.Y. US-p. 2620—Bliss B. E. et al "Ball-Joint position . . .".

Primary Examiner—Jeffery Brier
Attorney, Agent, or Firm—Guido Modiano; Albert Josif

[57] ABSTRACT

A device for controlling the positioning of the cursor displayed on the screen of interactive systems includes: a manual actuation element which is similar to a button and reacts, when pressed in any eccentric point of its surface (with respect to which a system of perpendicular coordinated axes X and Y is defined), by rocking, that is to say by tilting in the direction of the point where pressure is applied (to an extent determined by ergonomic criteria together with the other shape and elastic reaction characteristics of the button); sensor means which are operatively associated with the actuation element and are suitable to provide signals corresponding to the components in the directions X and Y of the consequent inclinations; a logic controller for analyzing the signals periodically and for calculating, for each cycle, an incremental movement to be applied to the cursor in the direction corresponding to the direction of the rocking motion and at a speed that increases as the associated modulus increases; a logic unit for accumulating the calculated movements and for transmitting the corresponding information to a system in a manner that is compatible with an ordinary mouse.

9 Claims, 4 Drawing Sheets

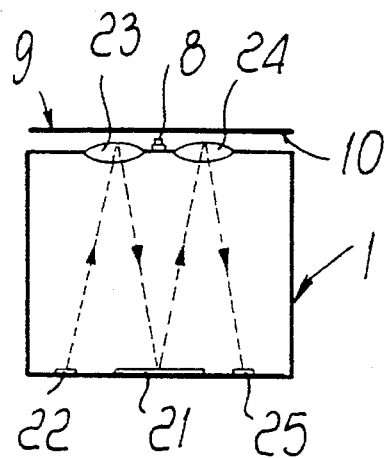
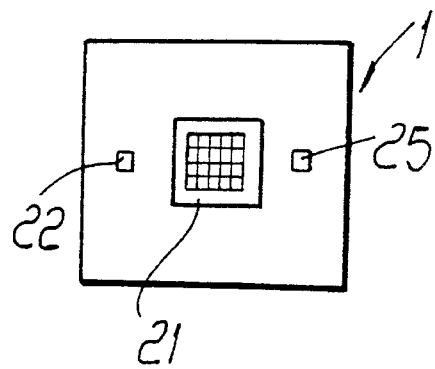
Fig.4A          Fig.4B
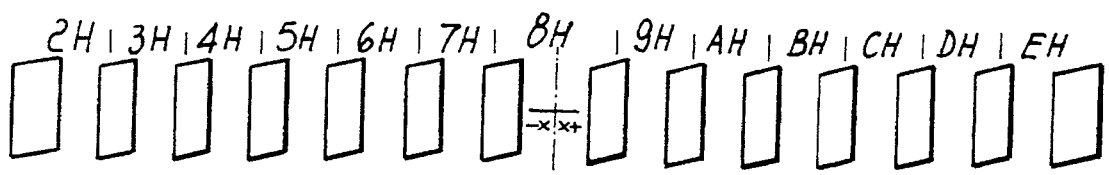
Fig.4C
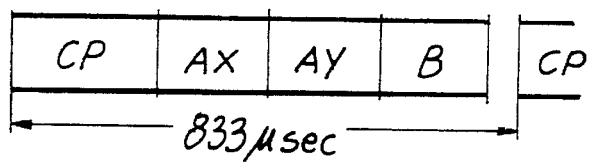
Fig.5

DEVICE FOR POINTING THE CURSOR ON THE SCREEN OF INTERACTIVE SYSTEMS

BACKGROUND OF THE INVENTION

The present invention relates to a device for controlling the positioning of the cursor displayed on the screen of personal computers, workstations, video terminals and generally of interactive systems that dialogue with the operator by means of images, either artificially generated or taken from reality.

As is known, a cursor is positioned by the operator in order to point at items of the displayed images, select them, engage them and cause the displaying system to move them, et cetera.

Cursor control is performed by virtue of devices which are generally termed "pointing devices", such as a mouse, a trackball, a joystick, and the like.

Existing pointing devices generally convert the movements of an actuation element controlled by the operator (in the case of the mouse, the body itself of the device) into signals used to control the proportional movements of the cursor on the screen.

A low or high proportionality factor is matched by a respectively low or high sensitivity of the control chain; sensitivity can also vary dynamically.

This arrangement has some intrinsic disadvantages:

a) if sensitivity is low, considerable space must be devoted to the pointing device: for example, the smooth and uncluttered worktable surface required to make a mouse run. Devices that require such space cannot be integrated with a keyboard and can be awkward in use due to the extent of the movements that they require (both to operate them and to move one's hand between said devices and the associated keyboards).

b) If sensitivity is high, the natural difficulty of controlling very small hand movements arises. For example, it becomes easy to induce unwanted movements of the cursor due to trembling or small involuntary movements of the hand.

Often it is not possible to find a compromise that avoids both drawbacks even by providing dynamically variable sensitivity.

The measurement of significant movements furthermore entails, in many pointing devices, the presence of moving parts that make them subject to wear, to the need for maintenance, and to limitations in reliability.

In order to overcome these problems, static pointing devices, such as the one proposed in European publication no. 433205 filed by International Business Machines Corporation, Armonk (USA), have been introduced. This device is integrated in the keyboard of a computer and controls cursor movements through the application of forces to an actuation button; the components of the force that are tangent to the plane of the keyboard determine the direction of the movements, and the component of the force that lies at right angles to the plane of the keyboard determines the speed of said movements.

Static-type actuation elements, such as the one described in European publication no. 433205, can solve the above described problems, ensuring compact size, optimum sensitivity and lack of mechanical wear. However, they are characterized by intrinsic difficulty in adjusting the action that is applied. It is in fact known that a human operator is not very accurate in assessing and controlling the amount of force applied to a fixed object. Without adequate tactile feedback, the only accurate reaction on which the operator of a static pointing device can rely to adjust his action is therefore the visual reaction provided by the movements of the cursor themselves; however, these movements occur in practice with small variable delays, and this causes the need for subsequent corrections to cancel the excess actuations. Furthermore, applying to key forces that are tangent to the keyboard surface is ergonomically unnatural, since it is dissonant with respect to the actions to be performed, even simultaneously, on the other keys, including the clicking keys themselves which are associated with the pointing device to control the execution of operations on the items pointed at with the cursor. Other devices that use similar principles and are at least partially subjected to similar ergonomic limitations are described in publications WO-A-8906023 (NCR Corp.) and DE-A-3523270 (Siemens AG).

SUMMARY OF THE INVENTION

A principal technical aim of the present invention is to provide a device that is not affected by the above described problems.

This aim is achieved with a device whose characteristics are defined in the appended claims.

BRIEF DESCRIPTION OF THE DRAWINGS

Further characteristics of the invention will become apparent from the following description of some preferred embodiments thereof, illustrated by way of non-limitative example in the accompanying drawings, wherein:

FIGS. 4 A-B-C are diagrams related to the rocking detector of the actuation element in a practical embodiment of the invention that uses optical sensors;

FIG. 5 is a diagram of the timing of the operating steps of the device;

DESCRIPTION OF THE PREFERRED EMBODIMENTS

Figure 2:
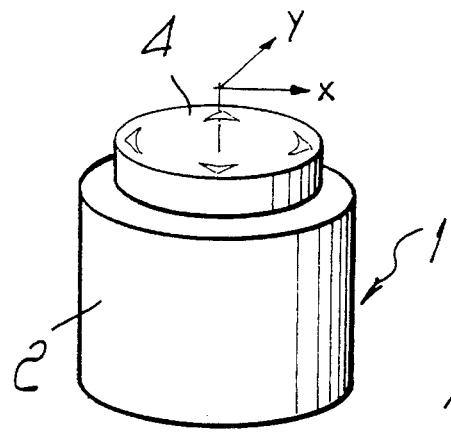
FIG. 2 is a perspective view of the actuation element for cursor movements.
Figure 3:
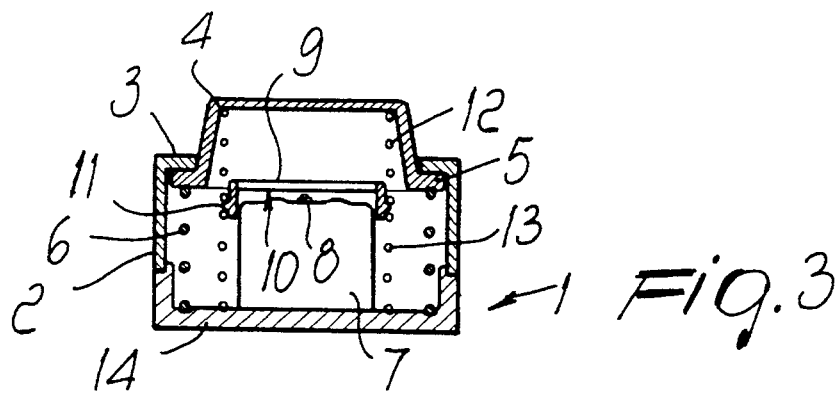
FIG. 3 is a transverse sectional view of said actuation element.

The actuation element of the pointing device according to the present invention is described with reference to FIGS. 1, 2 and 3. In FIG. 2, the reference numeral 1 generally designates the actuation element.

Said actuation element comprises a hollow cylinder 2 which has an inward annular fold 3 along its edge. A cap 4 is guided in the hollow cylinder 2 and constitutes the button for actuating the device. The button 4 has a flange 5 on which a helical spring 6 acts, keeping said flange in abutment against the annular fold 3.

The button 4 is circular and is operated by pressing on its upper surface in a point close to its edge chosen in any direction with respect to the center of said surface; the origin of a system of perpendicular axes X and Y is assumed to be located in said center. Regardless of the point of its application, pressure is applied substantially at right angles to the surface. The dimensions of the button, which are on the order of two centimeters, allow to quickly move the actuation point in order to vary or correct the path of the cursor; by keeping contact with the edge of the button it is also possible to perceive by touch, i.e. even without looking, which point of the button is being touched. By using known keyboard design techniques (use of raised portions and convex regions), the dimensions and the profile of the upper surface can be chosen so as to enhance this characteristic.

The plan shape of the button may also be other than exactly circular both to provide a more precise tactile indication of certain directions and to prevent rotations of the part about its own axis.

Since the movements of the button 4 are elastically opposed by the helical spring 6, they produce reactions that provide the desired tactile feedback together with the perceivable movements of said button.

The button 4 reacts to eccentric pressures by lowering and tilting, i.e. by sinking mainly on the side where pressure is applied and only to a smaller extent (almost zero for pressures applied to the edge) on the opposite side. The resulting motion of the button is therefore a two-dimensional rocking which is combined with a sliding motion along the axis of the hollow cylinder 2.

Inside the hollow cylinder 2 there is an optical assembly 7 which has a rocking pin 8 for a disk-like element 9; a mirror 10 is applied to the lower face of said disk-like element.

The disk-like element 9 has a peripheral collar 11 which is clamped between two coaxial springs 12 and 13. The spring 12 acts between the collar 11 and the button 4, whereas the spring 13 acts between the collar 11 and the bottom 14 of the hollow cylinder 2.

The unit formed by the two helical springs 12 and 13, between which the disk-like element 9 is interposed, provides an "elastic divider" of the movements of the button 4; these movements are converted into pure rocking movements, without translation, of the mirror 10, with inclination (oscillation) extents reduced to approximately half of those of the button itself and therefore more suitable to be measured by a simple optical system.

The components of the oscillation of the mirror 10 along the directions of the two perpendicular axes X and Y, measured by the optical assembly 7 in the manner described hereafter, are provided to a logic controller 15 (FIG. 1) by means of the content of two position counters 16.

The digital form in which this information is presented and processed entails "steps" in value which in practice reflect also the intrinsic uncertainties of the measurement system.

In order to ensure that the operator does not detect unpleasant discontinuities in the operation of the device, particularly along actuation directions that lie at 45° to the axes, in which both the range X and the range Y are limited according to the factor $1/\sqrt{2}$, and also in view of the response boosts associated with the nonlinearities described hereafter, the steps must be made fine enough. Practical tests have shown that the number of steps must be preferably at least 16 for the maximum stroke along each positive or negative direction of each axis. This description of the device refers to an embodiment based on the value 16 without compromising the possibility of other choices.

The measured X and Y rotational components are read in a cyclic manner by the logic controller 15 of the device and are used to determine, according to known geometric relations, the direction and modulus of the rocking, i.e. the direction in which the inclination of the button is maximum, and its extent. These components respectively determine the direction and the speed of the movements applied to the cursor on the screen.

At this point it should be noted that differently from conventional mice, the actuation element 1 is not capable of performing wide and permanent movements that can be proportionally converted into corresponding movements of the cursor on the screen.

According to the present invention, the logic controller 15 instead determines the movement of the cursor as a function of the small and temporary inclinations of the button 4 with respect to the idle position, integrated with respect to the time for which they are performed. More specifically, the logic controller, by periodically testing the position of the button 4, determines, as a function of said position and for each testing cycle, an incremental movement to be imparted to the cursor; when keeping the button pressed in a fixed position, therefore, the cursor is moved uniformly in a straight line; when releasing the button, the movement ceases.

For compatibility with conventional mice, which count their movements in the X and Y directions in conventional "steps" of approximately 1/200" and communicate with the connected system in these terms, the logic controller of the device according to the present invention evaluates the actions applied and expresses them in terms of equivalent movement steps (i.e., steps having an identical effect) of a conventional mouse. Since these movements and the corresponding speeds are not matched by actual movements of the device, they are termed "virtual".

The link established between inclination and virtual speed is of the following type:

for inclination values lower than a preset threshold r1 the speed is zero; this prevents unvoluntary cursor movements;

for inclination values above r1 and up to a second maximum value r2, a speed that increases gradually from a value v1 to a value v2;

beyond the maximum inclination r2, an invariant speed v2; this prevents the speed from reaching uncontrollable values.

Nonlinear patterns are suitable for the rule that governs the increase in speed with respect to the rotation. Analytically speaking, one may refer to exponential-type patterns (already proposed for other static pointing devices) which provide percent increases in speed which are proportional to absolute increases in inclination, or parabolic-type patterns (of an order that can be obtained from r1, r2, v1, and v2), which provide percent increases in speed which are proportional to percent increases in rotation. However, in practice it may also be convenient to expand the response regions that correspond to frequently-used speed ranges and provide, in a same device, different speed increase rules selectable by the operator, for example a rule more suitable for selecting system functions and a rule more suitable for graphic applications.

Essentially, the different rules are thus determined experimentally with reference to recurring working conditions and are included in the logic controller 15 of the device in table form, so as to approximate the continuous relations thus determined. The tables may directly list the values of the virtual motion that has accumulated, at each virtual speed level, during a working cycle of the logic controller.

Each movement value thus obtained is then converted by the logic controller into movement components along the axes X and Y, taking into account the measured direction and using known geometric relations.

The range of the rotations r1–r2 is chosen so as to work within a range of movements of the actuation element and of elastic reactions perceived by the operator that ensure good control and no strain; the range of the speeds v1–v2 is chosen so as to allow all useful movements of the cursor, from the smallest, most careful and accurate ones to the largest and fastest but coarse ones.

By way of example, strokes of the edge of the actuation button that are comprised between 1 and 6 millimeters, which correspond to rotations of approximately 3 to 18 degrees, elastic reactions between approximately 20 and 160 grams, and cursor speeds between approximately 5 pixels per second and 5000 pixels per second (crossing of an entire screen in a fraction of a second) have been found to be suitable for this purpose.

The values of the virtual movements processed by the logic controller 15 for the direction X and the direction Y are transferred to two respective accumulators 17. The movement is applied with the sign corresponding to the direction of each axis along which the button 4 has been lowered.

Each accumulator is capable of accumulating integer and fractional steps. The integer part of the accumulators can be analyzed by the logic controller so that, if the count is nonzero, communication with the system can be started as soon as possible.

In the described practical embodiment, each accumulator 17 has a 7-bit integer part (plus one bit reserved for indicating the sign) and an 8-bit fractional part.

In this manner it is possible to accumulate, during one or more scan cycles, up to 127 positive steps and 128 negative steps in addition to 0 to 255 step fractions; if these limits are reached, the accumulators are blocked until the subsequent communication with the system occurs.

When each scan cycle is completed, after updating the accumulators, the logic controller tests:

a) whether the connection to the system is not engaged by any previously started transmissions, and whether anything else, such as timing constraints or conditions dictated by the connection protocol handled by the logic controller, prevents starting a new transmission;

b) whether at least one of the two accumulators totals at least one full step;

c) whether at least one of the clicking keys, which provide the logic controller 15 with the signals T1 and T2, has been pressed or released, i.e. has changed status after the last transmission to the system.

If the first condition occurs together with at least one of the other two, a new transmission is prepared; accordingly, a packet of data that includes the integer part of the counters and the updated status of the keys is formed and stored in a transmission register 18.

Then, after resetting the integer parts of the accumulators 17 to zero without affecting any fractions, the first bit of the prepared packet starts to be sent to the system through a serial converter 19 and a transmitter 20. If instead the transmission of a previous packet is already in progress and the transmission period of the previous bit has ended and there are still bits to be transmitted, the transmission of the following bit is started. In any other case, if it is still not possible to continue the transmission or if there is nothing to transmit, the scan cycle is simply resumed and is in any case repeated indefinitely.

It should be noted that the behavior described for the integer part of the accumulators and for the transmission functions is the behavior of a normal mouse, with which compatibility is aimed at being ensured.

In practice, the elements 17, 18, and 19 can be formed as separate parts or can be located in the memory of a microprocessor that performs their functions together with all the functions of the logic controller 15.

The assembly 7, which has so far been described only in terms of its output through the counters 16, can be provided with various techniques:

a) By using a very small light emitter, an image whereof (a bright dot) is formed on the plane of a two-dimensional image detector (for example a CCD element for video cameras); the rocking of the mirror, placed along the optical path between the emitter and the detector, moves the projected bright dot; the image is analyzed to determine the position of the dot and thus, indirectly, the rotation of the mirror (in two dimensions).

b) By using variations of arrangement a) that use light sources that are not points but have various shapes (for example two narrow perpendicular bars, a single square area) and correspondingly linear-type sensors, one for each axis. Embodiments of this type can be based on discrete or continuous sensors; the latter require an analog-digital conversion step to provide the output usable by the logic controller.

For both cases a) and b), the optical arrangement to be used is of a conventional type, and only its application to the specific use is claimed herein.

c) By using an illuminated grid and a system of discrete sensors that detect the movements of an image of said grid; it is possible to use either two linear grids, one for each axis, or a single two-dimensional grid.

A description of this last solution is given hereafter as it is the preferential embodiment for the invention.

A practical embodiment of the optical assembly 7 is described with reference to the diagrams of FIGS. 4A-B-C.

The optical assembly 7, shown in a sectional view in FIG. 4A, can be calibrated mechanically during construction, for example by blocking it with hard-setting glue, in its position with respect to the mirror 10 so that it is axially aligned with said mirror when the actuation element is inactive.

The optical assembly 7 comprises, on a base plane shown in plan view in FIG. 4A, a geometrical grid 21 whose "bright" areas have high light reflectance and whose "dark" areas absorb light. The grid is illuminated by a light source, for example a light emitter 22; in order to contain power consumption, the grid is not illuminated completely; an optical system, constituted by a small convex lens 23 through which the light passes twice with a reflection on the mirror 10 between the two passages, generates an image of the light source 22 in a grid region that moves when the mirror rocks. A second twin convex lens 24 projects, again by means of a double passage of the light through it with an intermediate reflection, in another region of the mirror, an image of the illuminated grid region on the plane of a set of detectors 25 which is constituted by an array of nine (three by three) light-sensitive elements. The rocking of the mirror causes the illuminated region to shift over the grid and causes a shift of the grid region projected as an image on the plane of the detectors, which is said illuminated region; the image shift is similar to the shift that would occur ideally if the grid, which is transparent, were to shift physically between a point source of light and the array of detectors. The detection of the shifts of the grid is thus converted proportionally into a detection of the rocking movements.

In order to allow measurement along two axes, the grid is square, with sides parallel to the axes X and Y, and is constituted by the overlap of two patterns of bright and dark bands which are parallel to the two sides and are just as long (the overlap is dark where at least one of the overlapping patterns is dark). The array of detectors allows to follow the shift of the image of the grid as follows: to detect the passage of the bands lying at right angles to the axis X, the lighting of each one of the three sets of three detectors, aligned along each "column" of the array perpendicular to said axis X, is examined in parallel, assuming that "light" is seen by each set if at least one of its three detectors reports it; to detect the passage of the bands lying at right angles to the axis Y, the lighting of each one of the three sets of three detectors, aligned along each "row" of the array perpendicular to the axis Y, is examined in a similar manner. Once the spacing of the grid and the spacing of the detector array has been chosen appropriately as specified hereafter, it is possible to ensure that for any shift of the image along each axis at least one of the three lines of the detector array that lie at right angles to said axis is exposed to a stripe of the grid having dark and bright bands (not to a totally dark stripe). In this way, the measurements performed for each axis are made independent of the shifts performed along the other axis, as if a grid with a pattern of alternating bright and dark bands at right angles to said axis and with three detectors dedicated to it, detecting the passage of the bands, were available for each axis. The nonalignment between the detectors and the spacing of the grid is also such as to unequivocally link the sequence of light transitions, measured along each axis, to the direction of the corresponding movement and so as to give an unmistakable signal (simultaneous illumination of the three sets of detectors associated with the axis) proximate to passage through the central position of the grid with respect to said axis, which is marked by a wider bright band. FIG. 4C schematically shows the pattern of the grid, shown with respect to one axis; it includes a bright central band which is 0.5 mm wide and, on each side, six dark bands alternating with six bright bands, which are each 0.3 mm wide and cover the range of distances from the center that corresponds to the movements to be measured; the outside of this range is dark. The regions formed by the bands are numbered in hexadecimal code from 2H to EH as shown in the figure.

The nine photoelectric detectors are arranged in an array by stepping their viewports in the direction of each axis with spacings of 0.4 mm. Each detector furthermore has an individual opening (including lateral uncertainty fringes) of no more than 0.1 mm. The grid region examined by the detectors in each instant thus covers little less than 1 mm in the direction of each axis; this is also the minimum area required for the light source and for the currently illuminated grid region (it should be noted that the actual physical dimensions of the various optical components may also be different, while remaining linked to the dimensions of the grid by the enlargement ratios of the optical assembly; this ratio is assumed to be equal to 1 both for the lighting system and for the detection system in the described practical embodiment, whose elements are all placed, together with the grid, on the focal plane of the lenses, but different arrangements may also turn out to be convenient).

By directly analyzing the lighting pattern of the detectors as a function of the shift of the grid image it is possible to verify that the described geometry allows to unequivocally obtain the currently "pointed" point of the grid from the signals of the detectors and from their evolution order with an uncertainty of no more than ±0.1 mm in all directions and without ambiguities, whatever the shift. However, the point can be determined unequivocally only after the corresponding central band of the grid has been crossed at least once along the axis X and at least once along the axis Y.

It should be noted that at the central band there are regions where positioning is subject to greater uncertainties, but these uncertainties are irrelevant since the central band corresponds to a neutral region for cursor control.

The operation of the control circuit of the optical assembly is described with reference to the part of the functional block diagram of FIG. 1 that has not yet been described. The amplified and clipped signals of the parallel sets of detectors are designated by FX1, FX2, and FX3 (according to the order of their linear position) for the parallel sets examined to follow the axis X and FY1, FY2, and FY3 for the axis Y. The position counters 16 include, for each axis, a three-bit static register for the signals of the parallel sets of detectors and a four-bit counter of crossed bands (according to the hexadecimal coding shown in FIG. 4C).

Each band counter is set to 0H when the device is switched on, in order to indicate the initial uncertainty of the position; it is set to 8H as soon as a crossing of the central band of the axis is detected and then evolves, following the shifts, between 2H and EH and counts +1 when the signals of the three static registers of the axis pass from 101 to 001 (if the band counter is not less than 8H) or from 100 to 101 (if the band counter is not higher than 8H) and −1 when one of the reverse passages occurs.

This evolution is synchronized with a fixed timing, taken from the clock 26, which is fine enough to discriminate the fastest evolutions of the detectors (therefore with a period in the microsecond range), but it is in phase opposition with respect to the readouts of the counter which can be performed by the logic controller 15, in order to ensure stable and unambiguous reading.

The 7+7 bits of the position counters of the two axes are read by the logic controller at each scan cycle; in order to use them, they are converted separately from the above defined code, which is chosen to simplify the follow logic, into a code that indicates the values of the rotational components of the actuation element numerically, i.e. in a manner that is suitable for calculation.

The time sequence of the described operating steps for the operating logic of the device will become apparent from the timing diagram shown in FIG. 5.

T designates the duration of the scan cycle, for example 833 microseconds. This time is short enough to ensure that each packet of information transmitted to the system includes the accumulation of various scans, so that the effect of any irregular individual scans caused by rebounds, vibrations and the like is filtered out, and is also the bit time for transmission at 1200 bps.

The cycle T includes the steps CP (during which the position counters 16 are scanned, acquiring their value), the two steps AX and AY (during which the values that must be accumulated in the accumulators 17 are determined) and the step B (during which the unit determines whether it is necessary to start a transmission and starts it, or whether it must continue a previous transmission).

The present invention is susceptible of numerous modifications and variations, all of which share the same inventive concept.

Figure 6:
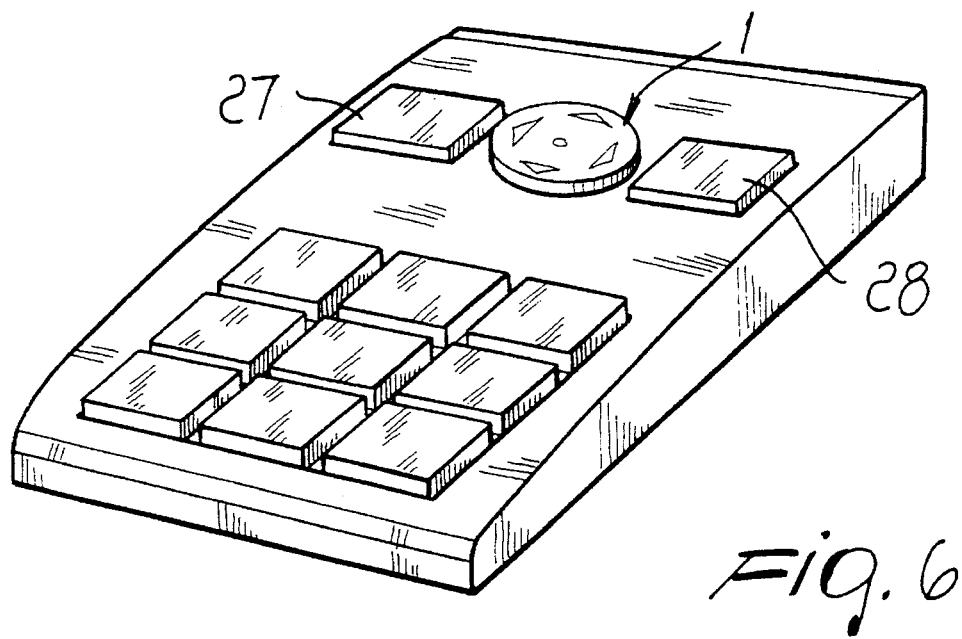
FIG. 6 is a general perspective view of the device, according to a further embodiment, which is integrated on a keyboard.
Figure 7:
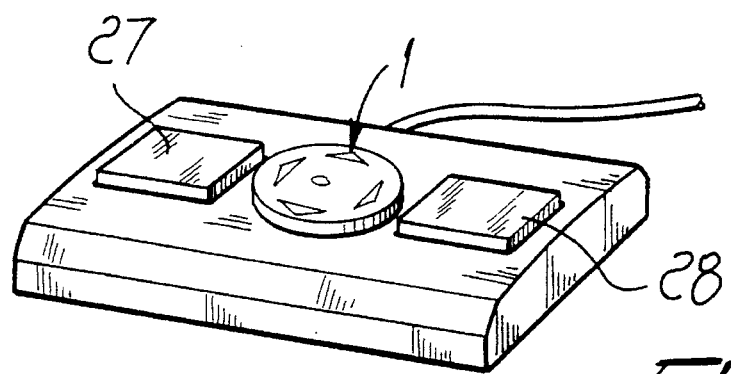
FIG. 7 is a general perspective view of the device, in a stand-alone embodiment, which is connected to the system by a cable and is suitable for resting on a working surface.
Figure 8:
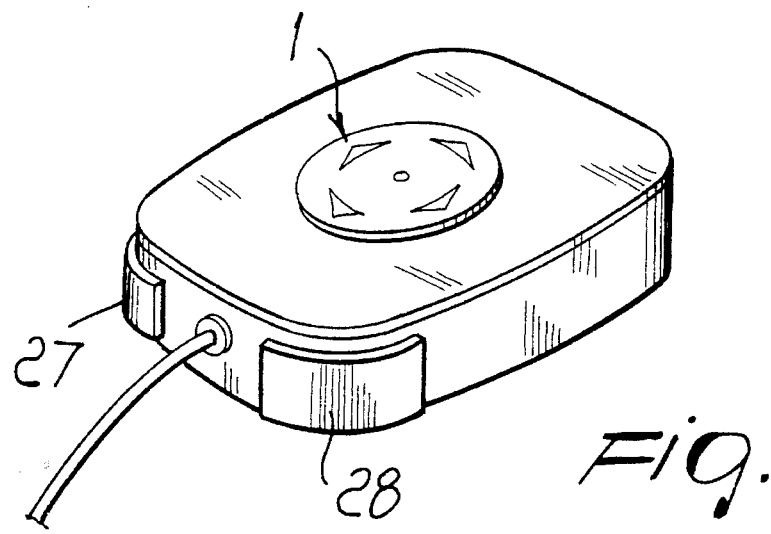
FIG. 8 is a general perspective view of the device, according to a stand-alone embodiment, which is suitable to be held in the palm of one hand and carried loosely except for the restraint constituted by the cable for connection to the system (which can in turn be eliminated, as in other existing portable devices, by using a wireless connection)

FIGS. 6, 7 and 8 are general perspective views of the device in various practical embodiments. Each figure shows the most appropriate relative arrangement of the actuation element 1 (whose internal structure has already been described) and of two clicking keys 27 and 28. The three elements are mutually adjacent in the versions of FIGS. 6 and 7, so that they can be operated with adjacent fingers of one hand (e.g. the index, middle, and ring fingers). In the version of FIG. 8, the actuation element is within reach of the hand gripping the device and the clicking buttons are within reach of other fingers of the same hand.

Figure 9:
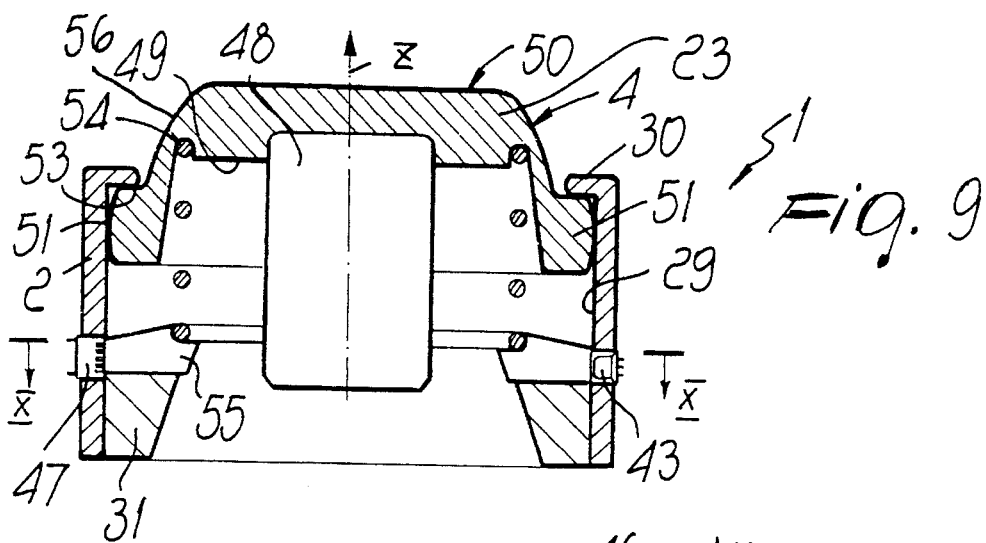
FIG. 9 is a sectional view, taken along the plane IX—IX of FIG. 10, of the actuation element according to another embodiment.
Figure 10:
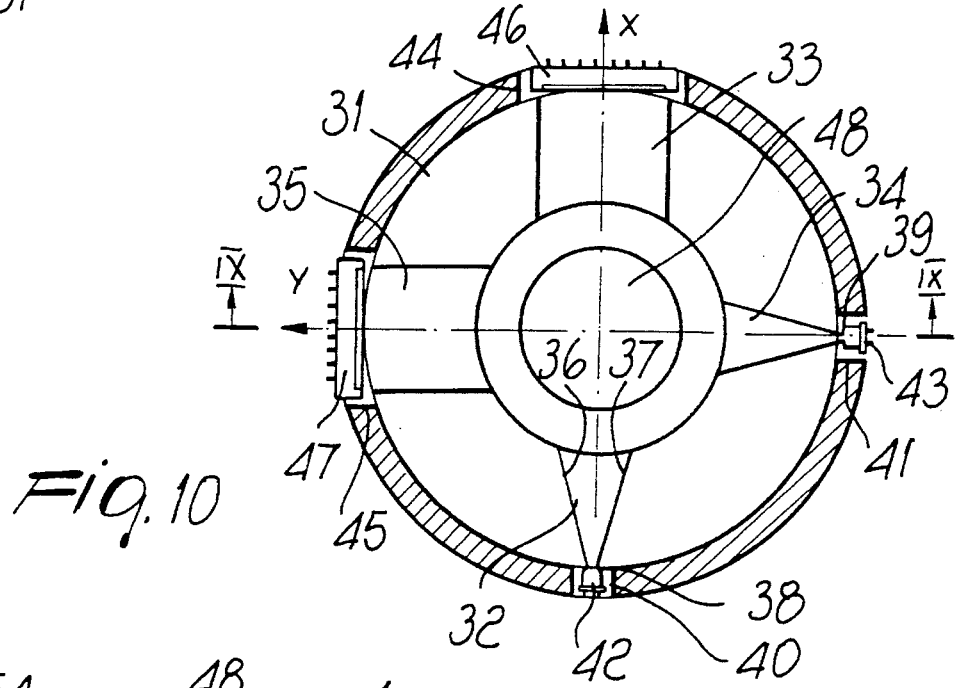
FIG. 10 is a sectional plan view, taken along the plane X—X of FIG. 9.
Figure 11:
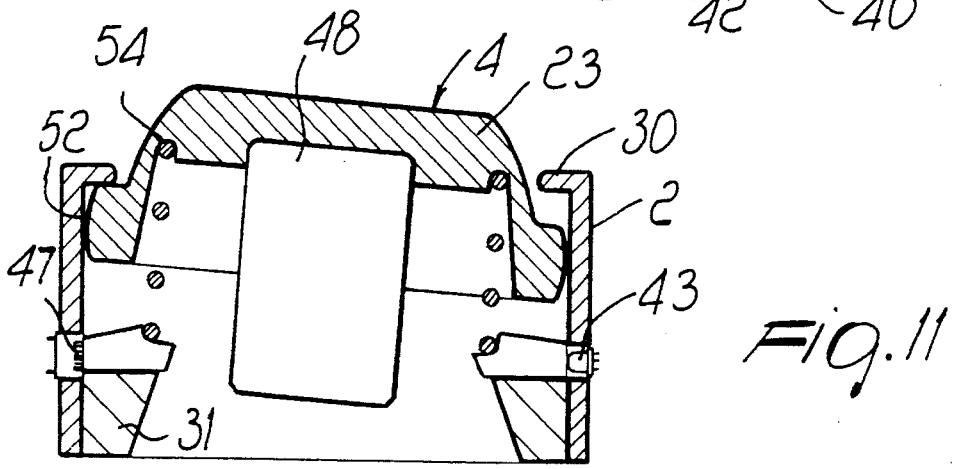
FIG. 11 is a sectional view of the actuation element, taken along a vertical plane, in a condition in which the button is tilted.

The embodiment of FIGS. 9, 10 and 11, in addition to greater mechanical simplification, allows to introduce a further level of dynamic response that facilitates large movements of the cursor on the screen.

In these figures, the reference numeral 1 again generally designates the actuation element of the device, which comprises the hollow cylinder 2 which is preset for installation in a conventional keyboard or in a mouse.

The cylinder 2, whose axis is designated by Z, has a cylindrical internal surface 29 delimited, at the top, by a circular lip 30 which protrudes inwards and acts as an abutment for the actuation button 4. A ring 31 is inserted and fixed in the lower portion of the cylinder 2, and four channels 32, 33 and 34, 35 are formed in said ring; said channels are radial with respect to the axis Z and pass through the thickness of the ring 31.

The channels 32 and 33 are aligned along an axis X passing through the axis Z, and the channels 34 and 35 are aligned along an axis Y passing through Z and lying at right angles to the axis X. The axes X and Y lie in a plane at right angles to the axis Z.

Each channel 32 and 33 is formed by two walls 36 and 37 which are parallel to the axis Z and diverge from the outside of the ring 31 inwards. The walls 36 and 37 of the two channels 32 and 33 form, at the internal surface 29 of the cylinder 2, two respective slots 38 and 39 which are elongated along the axis Z and face respective seats 40 and 41 formed in the cylinder 2.

Two emitters 42 and 43 are accommodated in the seats 40 and 41 and their light emission is limited by the slots 38 and 39.

The channels 33 and 35 lead to seats 44 and 45 which are formed in the ring 31 in a position diametrically opposite to the seats 40 and respectively 41 and accommodate photosensors 46 and 47.

Each photosensor 46 and 47 has a light-sensitive plane lying at right angles to the respective axis X and Y. Said plane includes an integrated circuit with a sequence of light-sensitive points aligned on a plane that is parallel or co-planar with respect to the plane of the axes X and Y.

By virtue of means not shown in the figure it is possible to adjust the position of the photosensors to allow centering during manufacture of the device.

Photosensors of the described type are already commercially available, for example under the trademark OPTOSENSOR TSL 214, manufactured by the company TEXAS INSTRUMENTS (U.S.A.). The number of sensitive points suitable for the purpose is not critical; however, in order to ensure adequately gradual operation, photosensors having at least 32 but preferably 64 light-sensitive points are used.

In order to focus the light emitted by the photoemitters 42 and 43 onto the photosensors 46 and there is a lens constituted by a cylindrical element 48 made of transparent material which is centrally fixed to the lower face 49 of the button 4.

The button 4 has an actuation surface 50 and is surrounded by a peripheral collar 51 which has a spherically cambered external portion 52 whose diameter is equal to the diameter of the surface 29. The collar 51 forms a step 53 suitable to abut against the inner lip 30 of the cylinder 2.

The rocking motion of the button 4 about the axis Z occurs in contrast with the action of a cylindrical spring 54 which acts by compression.

One end of said spring 54 rests on a shoulder 55 of the ring 31; the opposite end acts below the button 4 concentrically to the cylindrical element 48.

When the element 1 is inactive, the collar 51, by virtue of the action of the spring 54, abuts under the lip 30 and the element 48 is concentric with respect to the axis Z.

By applying an eccentric pressure on the surface 50 of the button 4, the spring 54 is compressed and the button 4 is tilted. The balance of the forces and reactions is such that one point of the step 53, located diametrically opposite to the point where the force acts, tends to stay in contact with the lip 30, whereas the center of the button 4 moves downwards. Conveniently, the peripheral region 56 of the button 4 is shaped so as to not interfere with the inner edge of the lip 30 in all possible movements of the button.

However, the spherical shape of the external cambered portion 52 of the collar 51 keeps the button perfectly guided when it is pressed by the operator, allowing him to induce a tilt of the button whose extent can be adjusted between zero and a maximum limit and whose direction can be chosen at will with respect to the plane X-Y.

The cylindrical lens 48 produces, on the plane of each photosensor 46 and 47, an image of the slots 38 and 39 which are respectively opposite, thus activating some of the light-sensitive points. The actual number of activated light-sensitive points varies according to the density of the points and according to the width of the slot, which is in turn chosen according to the sensitivity thresholds and the lighting levels that are typical of the components. The diameter of the cylindrical lens 48 is defined so as to focus the image onto the photosensors. For example, with a lens material having a refractive index of 1.5, the diameter of the lens must be equal to one third of the distance between each slot 38 and 39 and the respective diametrically opposite photosensor.

By arranging the slots 38 and 39 and the plane of the photosensors 46 and 47 in equidistant positions with respect to the axis Z, focusing is not only achieved in the inactive condition but is also maintained as a first approximation for small movements of the center of the lens from the axis Z produced by the tilting of the button 4.

The movements of the center of the lens 48 cause lateral movements of the images generated by the lens, i.e. movements at right angles to the axes X and Y and therefore directed along the rows of light-sensitive points. It should be noted that the images are also tilted and shifted vertically, but these movements are irrelevant for a first approximation.

The movement of each image is equal to twice the component of the movement of the center of the lens parallel to each light-sensitive plane.

The movement of the two images on the photosensors 46 and 47 and thus the distance of the activated sensitive points is proportional (within an approximation that is acceptable for the purposes of this application) to the two components of the inclination of the button 4 along the two coordinated axes X and Y.

A logic circuit, applied to the outputs of the photosensors, allows to obtain the two components X and Y of the inclination, which are digitized (in the case of 64 light-sensitive points, these components are comprised between −31 and +31) by identifying the sequence number of the illuminated point that is located for example furthest to the right in each photosensor, which corresponds to one "side" of the image, which can be detected more precisely and easily than the "center" of said image.

Figure 1:
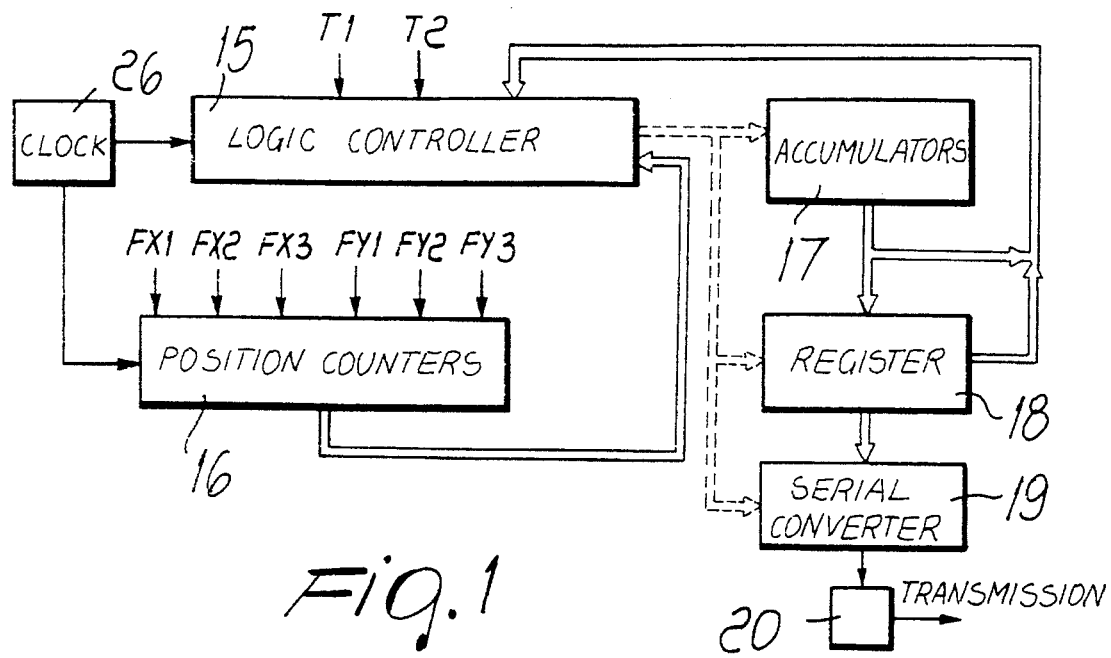
FIG. 1 is a functional block diagram of the pointing device according to a practical embodiment of the invention.

Two values are made available to the logic controller of the device and can be used and processed like the values of the "position counters" designated by the reference numeral 16 in the diagram of FIG. 1, to which reference is thus made for the description of operation.

Simplification of the mechanical construction of the device shown in FIGS. 9–11 and the consequent minimization of plays and uncertainties in measurement allow to control the positioning and the movement speed of the cursor not only as a function of the measured tilt of the button but also as a function of the rate at which said tilt varies in time. By increasing the speed of the cursor for a limited time when the device is actuated very rapidly, it is possible to easily and rapidly achieve large cursor movements that can be subsequently refined with a slower actuation.

What is claimed is:

1. Device for pointing the cursor on the screen of interactive systems, comprising a manual actuation element which is formed by a hollow cylinder, by a button which is supported so that it can rock in said hollow cylinder, by elastic reaction means for keeping said button rested against a fixed abutment; said button, when pressed against said elastic reaction means in any point that is eccentric with respect to the origin of a system of orthogonal axes X and Y placed at the center of said button, being suitable to be tilted in the direction of the point where pressure is applied; sensor means, operatively associated with said element, for providing signals that correspond to the components in the directions X and Y of the tilt that is a consequence of said pressure; a logic controller suitable to perform a cyclic analysis of said signals and to calculate, for each cycle, an incremental movement to be applied to the cursor in the direction corresponding to the direction of the tilt and at a speed that increases as the modulus of said tilt increases; a logic unit for accumulating the calculated movements and for transmitting the corresponding information to a system in a manner that is compatible with a normal mouse.

2. Device according to claim 1, further comprising a cylindrical element, made of transparent material, that is associated with said button and the axis whereof coincides with the axis Z that passes through the origin of said system of orthogonal axes X and Y and is at right angles to the plane of said axes when the button rests against said fixed abutment; said sensor means comprising a first photoemitter and a first photosensor, which are arranged along said axis X on opposite sides with respect to said cylindrical element, and a second photoemitter and a second photosensor, which are arranged along said axis Y on opposite sides with respect to said cylindrical element; said photoemitters being suitable to emit a laminar light beam along a plane perpendicular to the plane of said axes X and Y and passing through said axis Z, said photosensors having light-sensitive points that are aligned along a plane perpendicular to the plane of said laminar light beam, said laminar light beams striking the photosensors at the centerline plane of the light-sensitive points when the button is not activated, whereas actuation of the button activates the photosensitive points whose distance from said centerline plane is proportional to the tilt of the cylindrical element associated with said button, said photosensors being suitable to process said signals that correspond to the components of the inclination of the cylindrical element.

3. Device according to claim 2, wherein said hollow cylinder has an internal lip at one end and said button has an external collar which has a spherically cambered portion whose diameter is equal to the internal diameter of said cylinder, a compression spring being provided which acts between said button and a shoulder of said hollow cylinder for actuating said collar against said internal lip.

4. Device according to claim 3, wherein in order to obtain said laminar light beams there are two channels in said hollow cylinder 2, said channels being arranged radially along said axes X and Y and being formed by walls which are parallel to the axis Z and converge from the inside of the cylinder towards the outside, where they form two respective slots elongated along said axis Z.

5. Device according to claim 2, wherein said logic controller periodically reads the rocking components, provides signals corresponding to the direction and extent of said components, and converts said signals into incremental movements to be counted for the cursor, said logic controller being suitable to convert the rocking direction signals into a cursor movement direction and convert the rocking intensity data (modulus) into movement speed, said accumulated movements for the axes X and Y being stored, serialized and transmitted to the system for actuation.

6. Device according to claim 1, wherein said sensor elements comprise an optical mirror which is connected to said button and an optical assembly which converts the rocking movements of the mirror into flat shifting motions of the image of a grid with respect to an array of detectors, said grid being formed by the overlap of two crossed patterns of bands which are parallel to said axes X and Y, said grid being illuminated in a region variable according to the rocking, said detectors being examined in parallel by row and column groups of their array so as to separately detect the passage thereon of the bands of the image of the grid that lie at right angles to the axis X and of those that lie at right angles to the axis Y, the spacings of the grid and of the detector array being defined so as to provide unequivocal identification of the shifts of the image of the grid in the directions X and Y, position counters being provided which continuously follow these shifts and can be read periodically by the logic controller.

7. Device according to claim 1, wherein said actuation element is inserted proximate to clicking keys in a keyboard region that is associated with a connected system.

8. Device according to claim 1, wherein said actuation element is inserted proximate to clicking keys on the body of a device suitable for use on a working surface and connected to a system by a cable.

9. Device according to claim 1, wherein said actuation element is inserted on a device body suitable to be held with one hand, said actuation element being easily actuated with the thumb and clicking keys are arranged so that they can be actuated with other fingers of the same hand.

* * * * *